(12) United States Patent
Regard

(10) Patent No.: US 8,956,109 B2
(45) Date of Patent: Feb. 17, 2015

(54) FAIRING DEVICE FOR NACELLE OF AN AIRCRAFT PROPULSION POWER UNIT

(75) Inventor: Sebastien Regard, Soisy sur Seine (FR)

(73) Assignee: SNECMA, Paris (FR)

( * ) Notice: Subject to any disclaimer, the term of this patent is extended or adjusted under 35 U.S.C. 154(b) by 596 days.

(21) Appl. No.: 12/999,093

(22) PCT Filed: Apr. 10, 2009

(86) PCT No.: PCT/FR2009/000423
§ 371 (c)(1),
(2), (4) Date: Dec. 15, 2010

(87) PCT Pub. No.: WO2010/007218
PCT Pub. Date: Jan. 21, 2010

(65) Prior Publication Data
US 2011/0091317 A1    Apr. 21, 2011

(30) Foreign Application Priority Data
Jun. 25, 2008 (FR) ...................................... 08 03554

(51) Int. Cl.
*F01D 25/24* (2006.01)
*B64D 29/08* (2006.01)

(52) U.S. Cl.
CPC ...................................... *B64D 29/08* (2013.01)
USPC ....................................... 415/126; 415/214.1

(58) Field of Classification Search
CPC ......... B64D 29/04; B64D 29/06; B64D 29/08
USPC ................. 415/201, 123, 127, 220, 232, 128; 416/179, 248; 244/54, 62, 110 B; 60/797, 798
See application file for complete search history.

(56) References Cited

U.S. PATENT DOCUMENTS 3,347,578 A     10/1967  Sheehan et al.
4,044,973 A *   8/1977   Moorehead ..................... 244/54
(Continued)

FOREIGN PATENT DOCUMENTS

FR    2 830 842    4/2003
FR    2 855 497    12/2004
GB    2 202 588    9/1988

OTHER PUBLICATIONS

International Search Report issued Oct. 26, 2009 in PCT/FR09/000423 filed Apr. 10, 2009.

*Primary Examiner* — Edward Look
*Assistant Examiner* — Kayla McCaffrey
(74) *Attorney, Agent, or Firm* — Oblon, Spivak, McClelland, Maier & Neustadt, L.L.P.

(57) ABSTRACT

A nacelle, a part of which is the fairing device, surrounds a gas turbine engine and a support pylon on an aircraft fuselage. The pylon extends into a substantially horizontal plane of symmetry containing the longitudinal axis of the propulsion power unit, and includes a central compartment that is open on the top and on the bottom and provided for housing devices. The pylon is attached to the fuselage by a distal edge extending parallel to the longitudinal axis of the propulsion power unit. The fairing device includes an upper half-cowl (2) and a lower half-cowl substantially symmetrical relative to the plane of symmetry, and lockable therebetween, in a closed position. The upper half-cowl and lower half-cowl are individually pivotably mounted on the distal edge of the pylon such that, in an open position, access is provided at the same time to the engine and to the central compartment of the pylon.

14 Claims, 3 Drawing Sheets

(56) References Cited

U.S. PATENT DOCUMENTS

| | | | |
|---|---|---|---|
| 4,428,609 A * | 1/1984 | Baehr | 292/251 |
| 4,585,189 A * | 4/1986 | Buxton | 244/54 |
| 4,825,648 A | 5/1989 | Adamson | |
| 5,350,136 A * | 9/1994 | Prosser et al. | 244/129.4 |
| 5,467,941 A * | 11/1995 | Chee | 244/54 |
| 6,220,546 B1 * | 4/2001 | Klamka et al. | 244/129.4 |
| 6,227,485 B1 * | 5/2001 | Porte | 244/54 |
| 2003/0102405 A1 | 6/2003 | McEvoy | |
| 2004/0238687 A1 | 12/2004 | Jones et al. | |
| 2008/0258016 A1 * | 10/2008 | Gukeisen et al. | 244/53 R |

* cited by examiner

FAIRING DEVICE FOR NACELLE OF AN AIRCRAFT PROPULSION POWER UNIT

BACKGROUND OF THE INVENTION

1. Field of the Invention

The invention relates to the field of propulsion power units mounted on the fuselage of an aircraft and, in particular, to the fairing devices that envelop gas turbine engines.

2. Description of the Related Art

A propulsion power unit generally comprises a gas turbine engine, a nacelle surrounding the engine, and a nacelle support structure. The nacelle comprises, in the direction in which the gases flow, an air intake structure and at least one fairing device.

In the case of small airplanes, the propulsion power units are generally mounted at the rear of the fuselage of an aircraft, toward the top. In such instances, the support structure, also known as a pylon, is fixed by a first end to the nacelle. The second end of the pylon is fixed from a rear location on the aircraft fuselage.

The fairing device of the nacelle often comprises two opening cowls, an upper cowl and a lower cowl, as described in U.S. Pat. No. 4,585,189. These two opening cowls are mounted on the pylon in such a way that they can pivot about a longitudinal axis of articulation parallel to the engine axis via a pivot system situated where the pylon meets the nacelle.

However, given the location of the pivot system, the cowls do not encompass the volume formed by the pylon itself.

Now, provision is often made for equipment, such as air/air heat exchangers and regulating valves, to be installed inside the pylon. Thus, access to the interior of this pylon is needed so that maintenance can be carried out on this equipment. To provide this access, one technology involves positioning removable hatches on the surface of the pylon in line with where the equipment is situated. These hatches are generally produced using riveted panels screwed to the pylon. However, this technology means that it takes a great deal of time to access the equipment located inside the pylon.

Another technology involves positioning additional cowls for the pylon, which can pivot about a lateral axis of articulation perpendicular to the engine axis via a pivot system, situated at the boundary between the region housing the equipment and the region that contains no equipment. This technology makes maintenance easier by reducing the time taken to gain access, but does have the disadvantage of being more cumbersome and complicated to implement.

BRIEF SUMMARY OF THE INVENTION

It is an object of the invention to improve the fairing devices of the prior art and allow quick and easy access to the equipment installed in the pylon, without making the pylon more cumbersome.

In order to do that, one subject of the invention is a fairing device for a propulsion power unit comprising a gas turbine engine, a nacelle, of which said fairing device forms a part, and which surrounds the engine, and a support structure known as a pylon for securing to a fuselage of an aircraft, said pylon running in a substantially horizontal plane of symmetry containing the longitudinal axis of the propulsion power unit, and comprising a central compartment open from the top and from the bottom, and designed to house equipment, said pylon being intended to be attached to the fuselage by a distal edge running parallel to the longitudinal axis of the propulsion power unit, the fairing device consisting of at least an upper half-cowl and a lower half-cowl which are substantially symmetric with respect to said plane of symmetry and can be locked together, in the closed position, at their meeting point by a locking means. At least one of said upper and lower half-cowls is mounted so that it can pivot individually on said distal edge of the pylon so as, in the open position, to provide access both to the engine and to the central compartment of the pylon.

The upper half-cowl may comprise a substantially planar first part via which it is pivot-mounted on the distal lateral edge of the pylon and intended to close off the top of the central compartment of the pylon and a second part of semi-cylindrical shape belonging to the nacelle.

In one possible embodiment, said second part of the upper half-cowl is formed of at least two portions articulated to one another about an axis running parallel to the longitudinal axis of the propulsion power unit, a first of said portions being made as one piece with said first part of the upper half-cowl.

According to one possibility, the fairing device for a propulsion power unit comprises at least one holding means for keeping the upper half-cowl in the open position.

Said holding means may be an arm pivot-mounted via a first end on said first part of the upper half-cowl and a second end of which is able to come to rest against the pylon so as to immobilize the upper half-cowl in the open position.

Advantageously, in the open position, the center of gravity of the second portion of the upper half-cowl lies in a vertical plane passing through the first end of said holding arm.

The lower half-cowl may comprise a substantially planar first part via which it is pivot-mounted on the distal lateral edge of the pylon and intended to close off the underside of the central compartment of the pylon and a second part of semi-cylindrical shape belonging to the nacelle.

In one possible embodiment, said second part of the lower half-cowl is formed of at least two portions articulated to one another about an axis running parallel to the longitudinal axis of the propulsion power unit, a first of said portions being made as one piece with said first part of the lower half-cowl.

According to one possibility, the fairing device for a propulsion power unit comprises at least one holding means for keeping the lower half-cowl in the open position.

Said holding means may be an arm pivot-mounted via a first end on said first part of the lower half-cowl and a second end of which is able to catch on the pylon so as to immobilize the lower half-cowl in the open position.

Advantageously, in the open position, the center of gravity of the second portion of the lower half-cowl lies in a vertical plane passing through the first end of said holding arm.

BRIEF DESCRIPTION OF THE SEVERAL VIEWS OF THE DRAWINGS

The invention and its advantages will be better understood from reading the detailed description which follows, of some exemplary embodiments of the invention which are given by way of nonlimiting illustration. This description refers to the attached figures in which.

DETAILED DESCRIPTION OF THE INVENTION

Figure 1:
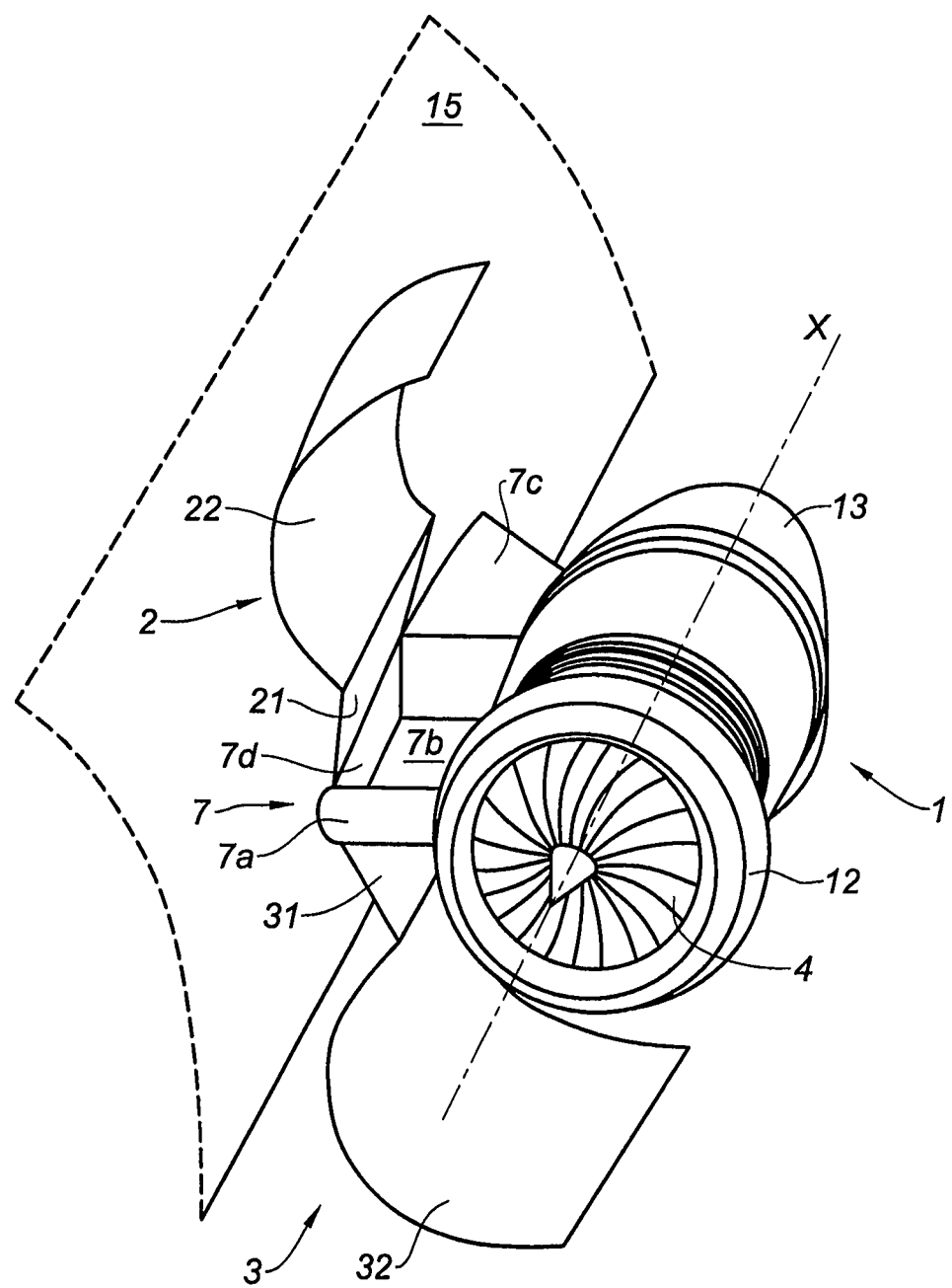
FIG. 1 is a perspective view of a propulsion power unit attached to the fuselage of an aircraft and equipped with a fairing device according to the invention.
Figure 2:
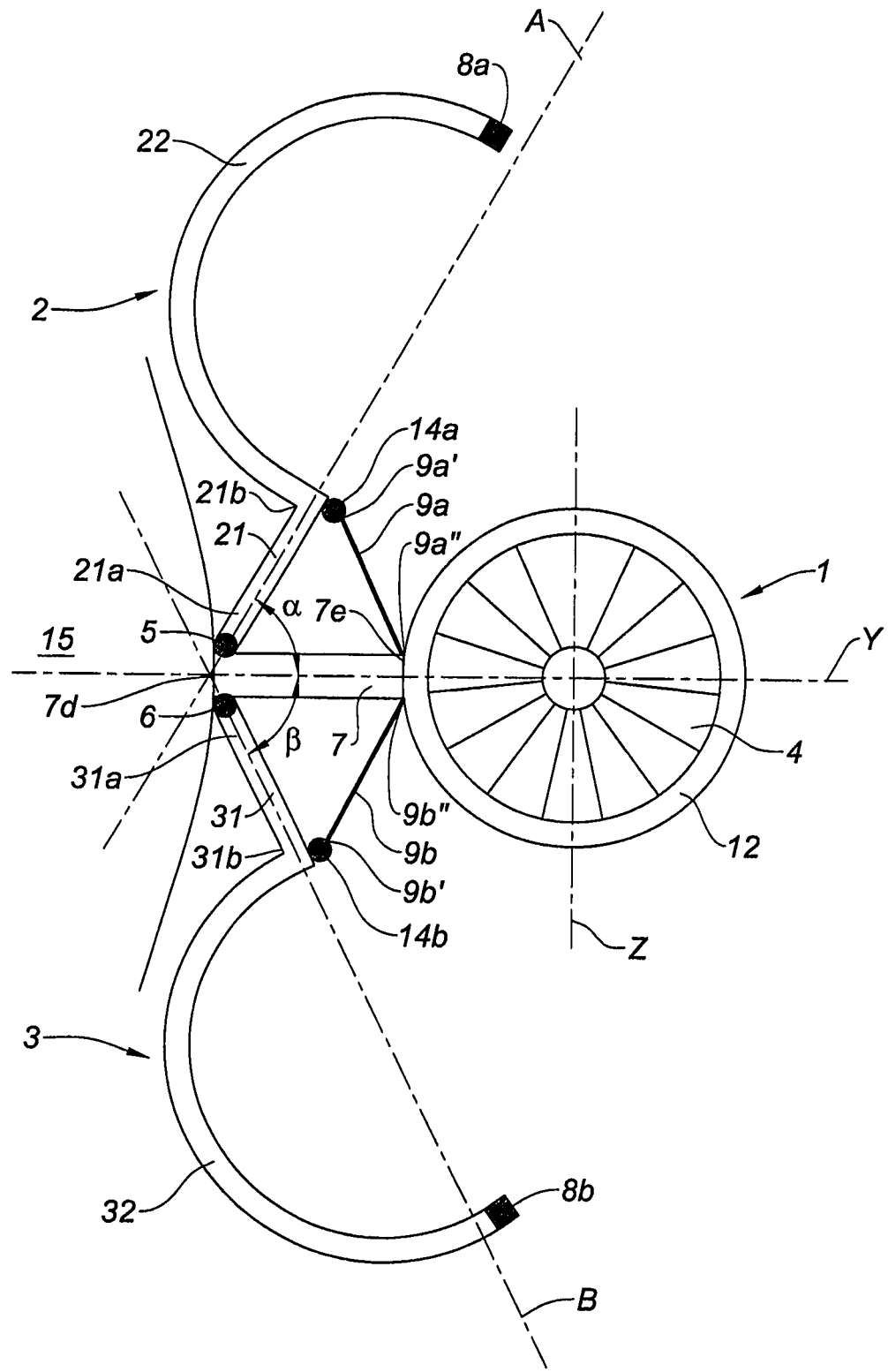
FIG. 2 is a front view of the propulsion power unit of FIG. 1.

FIGS. 1 and 2 are respectively perspective and front views of a propulsion power unit 1 fixed to a fuselage 15 of an aircraft, equipped with a fairing device in the open position, according to the invention. The propulsion power unit 1 comprises a gas turbine engine 4, a nacelle of which the fairing device forms part and which surrounds the engine 4, and a support structure 7 known as a pylon. The nacelle of the propulsion power unit 1 comprises, in the direction in which the air flows, an air intake structure 12, the fairing device, and a thrust reverser 13. The pylon 7 runs in a substantially horizontal plane of symmetry containing the longitudinal axis X of the propulsion power unit and comprises a central compartment 7b open at the top and at the bottom, and designed to house equipment, not depicted. The pylon 7 is attached to the fuselage 15 by a distal edge 7d running parallel to the longitudinal axis of the propulsion power unit 1, the proximal edge 7e being attached to the nacelle. The fairing device consists of an upper half-cowl 2 and of a lower half-cowl 3 which are substantially symmetric with respect to said plane of symmetry containing the longitudinal axis X.

The half-cowl 2 comprises a substantially planar first part 21 via which it is pivot-mounted, using a pivot device 5, fixed to a first end 21a, to the distal lateral edge 7d of the pylon 7 and intended to close off the top of the central compartment 7b, and a second part 22 of semi-cylindrical shape, fixed by a first end to a second end 21b, and intended to complete the upper part of the nacelle.

Likewise, the half-cowl 3 comprises a substantially planar first part 31 via which it is pivot-mounted, using a pivot device 6, by a first end 31a to the distal lateral edge 7d of the pylon 7 and intended to close off the underside of the central compartment 7b, and a second part 32, of semi-cylindrical shape, fixed by a first end to a second end 31b and intended to complete the lower part of the nacelle.

The pylon 7 comprises three volumes, denoted 7a, 7b and 7c in the direction in which the gases flow. A volume 7a, of aerodynamic shape, contains no equipment. The volume 7b, of parallelepipedal shape, is accessible and contains equipment, not depicted. A volume 7c situated at the rear contains no equipment. The three axes, axial X, radial Y and tangential Z situate the axes of the propulsion power unit 1.

In FIG. 2, the line A is contained in a plane substantially corresponding to the surface of the first part 21 of the half-cowl 2. The line B is contained in a plane substantially corresponding to the surface of the first part 31 of the half-cowl 3.

Holding arms 9a and 9b are fixed respectively to a first end 9a' and 9b' under the second end 21b of the first part 21 of the half-cowl 2 and under the second end 31b of the first part 31 of the half-cowl 3, via rotation devices 14a and 14b. These holding arms 9a and 9b allow the respective half-cowls 2 and 3 to be kept in the open position.

In a position in which the half-cowls 2 and 3 are closed, the respective holding arms 9a and 9b are retracted and immobilized, in the furled position, by rotation devices 14a and 14b under the first parts 21 and 31 of the half-cowls 2 and 3. In the open position, the holding arms 9a and 9b are fixed, on the one hand, by the rotation devices 14a and 14b and, on the other hand, by their end 9a" and 9b" at the proximal edge 7e of the pylon 7.

With the half-cowl 2 open, an angle formed by the line A and the radial engine axis Y, denoted α, is preferably greater than 55°. Likewise, an angle formed by the line B and the radial engine axis Y, denoted β, is also preferably greater than 55°. These angular values move the fairing device aside sufficiently to permit ease of access to the central compartment 7b and to the engine 4.

The two half-cowls 2 and 3 are locked together in the closed position at their meeting point by a catch 8a placed on a second end of the part 22 of the upper half-cowl 2 and 8b placed on a second end of the part 32 of the lower half-cowl 3. The upper 2 and lower 3 half-cowls are mounted so that they can pivot individually on the distal edge 7d of the pylon 7 so that when they are in the open position they provide access both to the engine 4 and to the central compartment 7b of the pylon 7.

Figure 3:
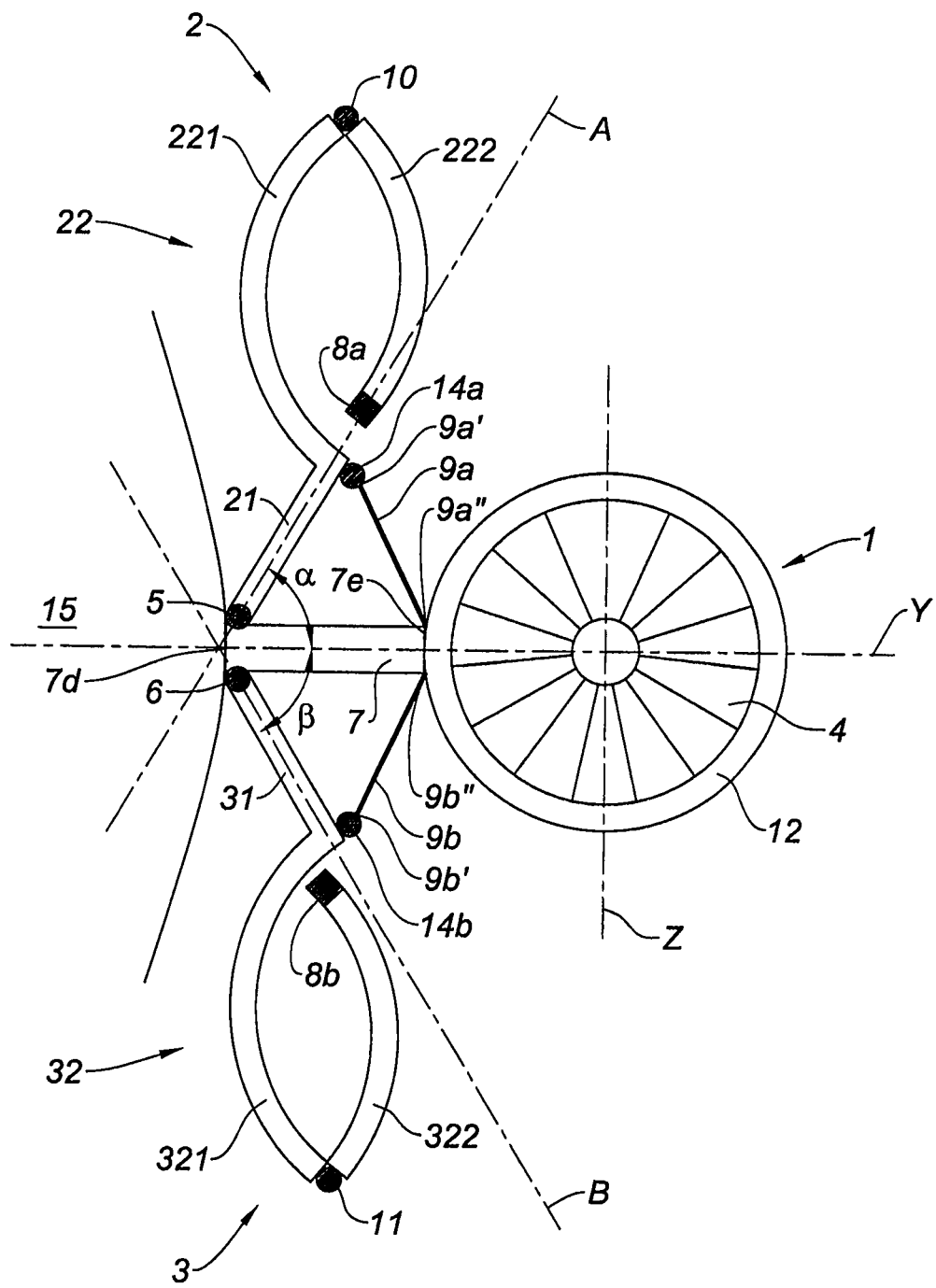
FIG. 3 is a view similar to FIG. 2, of a propulsion power unit equipped with another fairing device according to the invention.

In the alternative form illustrated in FIG. 3, the upper half-cowl 2 comprises the first part 21, the second part 22 being produced in two portions. A first portion 221 of partially semi-cylindrical shape is fixed to the second end 21b of the first part 21. A hinge 10 is fixed to the second end of the first portion 221. The second portion 222 is also of partially semi-cylindrical shape. A first end of the second portion 222 is fixed to the hinge 10, thus making it possible, in the closed position, to complete the upper part of the nacelle. The catch 8a is fixed to a second end of the portion 222.

Likewise, the lower half-cowl 3 comprises a first part 31, the second part 32 being produced in two portions. A first portion 321, of partially semi-cylindrical shape, is fixed to the second end 31b of the first part 31. A hinge 11 is fixed to the second end of the first portion 321. The second portion 322 is also of partially semi-cylindrical shape. A first end of the second portion 322 is fixed to the hinge 11, thus making it possible, in the closed position, to complete the lower part of the nacelle. The catch 8b is fixed to a second end of the portion 322.

The portions 221 and 222 have substantially identical dimensions given the position of the hinge 10. Bearing in mind the length of the holding arm 9a, when the upper half-cowl 2 is open, the center of gravity of the second portion 222 lies on a vertical passing through the rotation device 14a. With this configuration, the second portion 222 fixes itself along the first portion 221 under its own weight.

The dimension of the first portion 321 is substantially twice that of the second portion 322, given the position of the hinge 11. Bearing in mind the length of the holding arm 9b, when the lower half-cowl 3 is open, the center of gravity of the second portion 322 is situated on a vertical passing through the rotation device 14b. With this configuration, the second portion 322 will fix itself, under its own weight, toward the inside of the semi-cylindrical shape of the first portion 321.

The hinges 10 and 11 could be located differently, which would entail different respective dimensions for the portions 221 and 222 on the one hand, and 321 and 322 on the other.

The drive for opening the half-cowls 2 and 3 may be provided manually or automatically, it being possible for each half-cowl to be opened independently of the other, or not.

In another configuration that has not been depicted, the rotation devices 14a and 14b could be situated at the proximal end 7e of the pylon 7. In that case, a second end 9a" and 9b" of the holding arms 9a and 9b respectively is fixed, when the fairing device is in the open position, in a region configured for this immobilization, under the junction between the parts 210 and 221 of the half-cowl 2 and under the junction of the parts 310 and 321 of the half-cowl 3 respectively. In the position in which the fairing device is closed, the holding arms 9a and 9b are retracted and immobilized, furled, by the hinges 14a and 14b under the first parts 21 and 22 of the half-cowls 2 and 3 respectively.

In yet another configuration which has not been depicted, the holding arms 9a and 9b could also be brought back on each operation of opening the fairing device.

The invention claimed is:

1. A fairing device for a propulsion power unit comprising a gas turbine engine, a nacelle, of which said fairing device forms a part, and which surrounds the engine, and a pylon for securing to a fuselage of an aircraft, said pylon extending in a substantially horizontal plane of symmetry containing a longitudinal axis of the propulsion power unit, and comprising a central compartment open from the top and from the bottom, and designed to house equipment, said pylon being configured to be attached to the fuselage by a distal edge running parallel to the longitudinal axis of the propulsion power unit, the fairing device comprising:

an upper half-cowl and a lower half-cowl which are substantially symmetric with respect to said horizontal plane of symmetry and can be locked together, in a closed position, at a meeting point between the upper and lower half-cowls by a locking device, wherein said upper and lower half-cowls are mounted so as to be pivotable individually and independently on said distal edge of the pylon so as, in an open position, to provide access both to the engine and to the central compartment of the pylon, wherein the upper half-cowl includes a substantially planar first part which closes the top of the central compartment of the pylon in the closed position and a semi-cylindrical second part belonging to an upper part of the nacelle, a first end of the first part of the upper half-cowl being a free end which is pivot-mounted on the distal edge of the pylon via a first pivot device, a second end of the first part of the upper half-cowl being fixed to a first end of the second part of the upper half-cowl, and a second end of the second part of the upper half-cowl including a first portion of the locking device, and wherein the lower half-cowl includes a substantially planar first part which closes the bottom of the central compartment of the pylon in the closed position and a semi-cylindrical second part belonging to a lower part of the nacelle, a first end of the first part of the lower half-cowl being a free end which is pivot-mounted on the distal edge of the pylon via a second pivot device, a second end of the first part of the lower half-cowl being fixed to a first end of the second part of the lower half-cowl, and a second end of the second part of the lower half-cowl including a second portion of the locking device.

2. The fairing device for a propulsion power unit as claimed in claim 1, wherein the second part of the upper half-cowl is formed of at least two portions articulated to one another about an axis running parallel to the longitudinal axis of the propulsion power unit, a first of said portions being made as one piece with said first part of the upper half-cowl.

3. The fairing device for a propulsion power unit as claimed in claim 2, wherein said faring device comprises at least one holding means for keeping the upper half-cowl in the open position, said holding means is an arm, a first end of the holding arm is pivot-mounted on the second end on said first part of the upper half-cowl and a second end of the holding arm rests against the pylon so as to immobilize the upper half-cowl in the open position.

4. The fairing device for a propulsion power unit as claimed in claim 3, wherein, in the open position, a center of gravity of the second portion of the upper half-cowl lies in a vertical plane passing through the first end of said holding arm.

5. The fairing device for a propulsion power unit as claimed in claim 1, wherein said fairing device comprises at least one holding means for keeping the upper half-cowl in the open position.

6. The fairing device for a propulsion power unit as claimed in claim 5, wherein said holding means is an arm, a first end of the holding arm is pivot-mounted on the second end on said first part of the upper half-cowl and a second end of the holding arm rests against the pylon so as to immobilize the upper half-cowl in the open position.

7. The fairing device for a propulsion power unit as claimed in claim 1, wherein the second part of the half-cowl is formed of at least two portions articulated to one another about an axis running parallel to the longitudinal axis of the propulsion power unit, a first of said portions being made as one piece with said first part of the lower half-cowl.

8. The fairing device for a propulsion power unit as claimed in claim 7, wherein said fairing device comprises at least one holding means for keeping the lower half-cowl in the open position.

9. The fairing device for a propulsion power unit as claimed in claim 8, wherein said holding means is an arm, a first end of the holding arm is pivot-mounted on the second end on said first part of the lower half-cowl and a second end of the holding arm catches on the pylon so as to immobilize the lower half-cowl in the open position.

10. The fairing device for a propulsion power unit as claimed in claim 9, wherein, in the open position, a center of gravity of the second portion of the lower half-cowl lies in a vertical plane passing through said first end of said holding arm.

11. The fairing device for a propulsion power unit as claimed in claim 1, wherein said fairing device comprises at least one holding means for keeping the lower half-cowl in the open position.

12. The fairing device for a propulsion power unit as claimed in claim 11, wherein said holding means is an arm, a first end of the holding arm is pivot-mounted on the second end on said first part of the lower half-cowl and a second end of the holding arm catches on the pylon so as to immobilize the lower half-cowl in the open position.

13. A propulsion power unit comprising the fairing device as claimed in claim 1.

14. The fairing device for a propulsion power unit as claimed in claim 1, wherein outer surfaces of the first part of the upper half-cowl and the first part of lower half-cowl directly face an outside of the engine.

* * * * *